United States Patent
Jammalamadaka et al.

(10) Patent No.: US 8,146,998 B2
(45) Date of Patent: Apr. 3, 2012

(54) CHUCK REDUCING DEVICE

(75) Inventors: Sai Prasad Jammalamadaka, Novi, MI (US); Paul Castellani, Sterling Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 162 days.

(21) Appl. No.: 12/242,187

(22) Filed: Sep. 30, 2008

(65) Prior Publication Data

US 2010/0078984 A1 Apr. 1, 2010

(51) Int. Cl.
*B60N 2/48* (2006.01)
*A47C 7/36* (2006.01)

(52) U.S. Cl. ........................ 297/408; 297/403
(58) Field of Classification Search .................. 297/408, 297/463.1, 409, 403
See application file for complete search history.

(56) References Cited

U.S. PATENT DOCUMENTS

| | | | | | |
|---|---|---|---|---|---|
| 568,710 | A | * | 9/1896 | Williams | 297/403 |
| 3,512,833 | A | * | 5/1970 | Sugiura | 297/410 |
| 4,205,878 | A | * | 6/1980 | Wooten | 297/391 |
| 4,834,456 | A | * | 5/1989 | Barros et al. | 297/403 |
| 5,011,225 | A | * | 4/1991 | Nemoto | 297/408 |
| 5,056,867 | A | * | 10/1991 | Foster et al. | 297/410 |
| 5,145,233 | A | * | 9/1992 | Nagashima | 297/408 |
| 5,211,445 | A | * | 5/1993 | Husted et al. | 297/378.12 |
| 5,246,270 | A | * | 9/1993 | Vogel | 297/232 |
| 5,346,282 | A | * | 9/1994 | De Filippo | 297/395 |
| 5,913,568 | A | * | 6/1999 | Brightbill et al. | 297/258.1 |
| 6,612,653 | B2 | * | 9/2003 | Takata | 297/408 |
| 6,796,612 | B2 | * | 9/2004 | Shephard | 297/367 R |
| 6,902,232 | B2 | | 6/2005 | Kamrath et al. | |
| 7,044,555 | B2 | | 5/2006 | Saberan | |
| 7,322,646 | B2 | | 1/2008 | Jammalamadaka et al. | |
| 7,341,312 | B2 | | 3/2008 | Gauthier et al. | |
| 2005/0225146 | A1 | | 10/2005 | Sutter, Jr. et al. | |
| 2007/0090251 | A1 | * | 4/2007 | Padden | 248/303 |
| 2007/0236070 | A1 | | 10/2007 | Brockman | |
| 2007/0296260 | A1 | | 12/2007 | Stossel | |
| 2008/0036263 | A1 | | 2/2008 | Little | |

FOREIGN PATENT DOCUMENTS

| | | |
|---|---|---|
| DE | 100 38 884 A1 | 4/2001 |
| DE | 102 34 164 A1 | 3/2003 |
| EP | 0 636 513 | 2/1995 |
| EP | 0 747 259 | 12/1996 |
| WO | 2006/041359 | 4/2006 |
| WO | 2007/112568 | 11/2007 |
| WO | 2007/143861 | 12/2007 |

OTHER PUBLICATIONS

Office Action from corresponding German Appn. 10 2009 038 699.8-16, dated Apr. 15, 2010, 4 pgs.
English Abstract corresponding to DE 10 038 884 A1.
English Abstract corresponding to DE 10 234 164 A1.
English Abstract corresponding to EP 0 636 513.
English Abstract corresponding to EP 0 747 259.

* cited by examiner

*Primary Examiner* — David Dunn
*Assistant Examiner* — Tania Abraham
(74) *Attorney, Agent, or Firm* — Brooks Kushman P.C.

(57) ABSTRACT

A vehicle head restraint includes a head restraint frame having at least one post for attaching the head restraint to a seat back. The head restraint is pivotable relative to post. The head restraint also includes a spring clip attached to the head restraint frame and a stop rigidly held relative to the post, such that the stop contacts the spring clip when the head restraint in positioned in an upright position.

13 Claims, 4 Drawing Sheets

CHUCK REDUCING DEVICE

BACKGROUND OF THE INVENTION

1. Field of The Invention

The present invention relates to a vehicle head restraint with reduced chuck when the head restraint is in the upright position.

2. Background Art

Adjustable head restraints for vehicle seats are provided for comfort and safety of an occupant. For example, U.S. Pat. No. 6,631,956 B2, which issued on Oct. 14, 2003, discloses an adjustable head restraint with a rod that supports the head restraint and translates relative to sleeves of the seat back.

Another offering of the prior art is a head restraint that is adjustable on posts that extend from the seat back. The posts are received within receptacles of the seat back and the posts are also adjustable relative to the receptacles. The head restraint includes a detent mechanism for maintaining a position of the head restraint relative to the posts; and the receptacles include a locking mechanism for locking the posts relative to the receptacles. Moreover, some variations of the prior art head restraints allow folding.

Although these head restraints of the prior art work reasonably well, the mechanism for folding tends to suffer from vibrations that lead to undesirable buzzing, squeaking, and rattling noises when the head restraint is in the upright position. Noise produced in this manner is often referred to as chuck and may act as a distraction to vehicle occupants. One of the causes of chuck is often due to the design and assembly clearances of the folding mechanism. In addition to the aesthetically displeasing sound produced, chuck also leads to an increased wear and tear on the head restraint folding mechanisms.

Accordingly, for at least these reasons, designs for improved head restraint folding mechanism are desirable.

SUMMARY OF THE INVENTION

The present invention solves one or more problems of the prior art by providing in at least one embodiment a head restraint with reduced chuck. The head restraint of the present embodiment includes a head restraint frame having a support structure for positioning the head restraint proximate to a seat back. The head restraint of this embodiment is pivotable relative to the support structure. The head restraint also includes a spring clip attached to the head restraint frame and a stop rigidly held relative to the post, such that the stop contacts the spring clip when the head restraint is positioned in an upright position.

In another embodiment of the present invention, a vehicle seat incorporating the head restraint set forth above is provided. The head restraint is positioned proximate to a vehicle seat by a support structure. The vehicle seat includes a seat back and a seat bottom. The seat bottom includes a forward section and a rear section. The seat back has a bottom section positioned proximate to a rear section of the seat bottom. The head restraint positioned proximate to a top section of the seat back.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
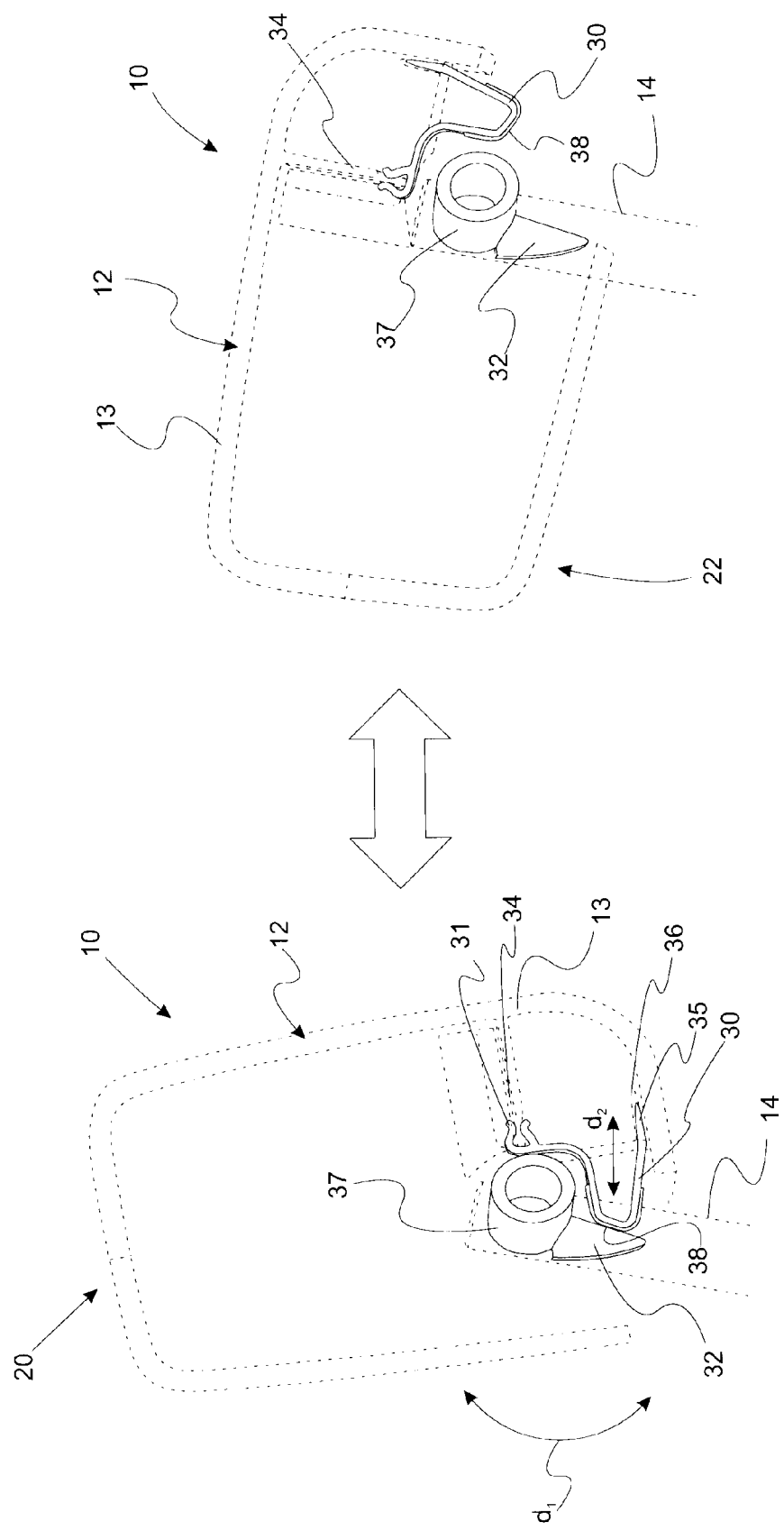
FIG. 1 is a schematic cross section showing the incorporation of a chuck eliminating clip in a head restraint as well as movement between the upright and folded positions.

With reference to FIG. 1, a schematic side view of an exemplary embodiment of a head restraint is provided. Head restraint 10 includes head restraint frame 12 which has a support structure for positioning head restraint 10 proximate to a seat back. In the specific variation depicted in FIG. 1 the support structure includes at least one post 14. Post 14 is used for attaching head restraint 10 to a seat back as set forth below. Head restraint 10 is pivotable along direction $d_1$ relative to post 14 from upright position 20 to folded position 22 and visa versa. Spring clip 30 is attached to head restraint frame 12. In the specific variation depicted in this figure, the attachment is to rear shell 13. The attachment of spring clip 30 to head restraint frame 12 may be direct or indirect with other components interposed between the spring clip and the head restraint. FIG. 1 provides a depiction in which spring end 31 is attached to rib 34 and spring end 35 is attached to receptacle 36.

In a refinement, spring end 31 is fixed relative to head restraint frame 12. In a further refinement, spring end 35 is able to move somewhat in receptacle 36 thereby allowing center spring section 38 to move along direction $d_2$ in response to contacting stop 32. In still another refinement, spring end 35 is fixed within receptacle 36. Stop 32 is rigidly held relative to post 14. In the specific example of FIG. 1, stop 32 is rigidly attached to cross member 37 which is fixed to post 14. Stop 32 contacts spring clip 30 when head restraint in positioned in upright position such that chuck in the head restraint is reduced when compared to a head restraint that does not include the spring clip. An example of a particularly useful head restraint design in which a spring clip may be incorporated is found in U.S. patent application Ser. No. 11/680,517 filed on Feb. 28, 2007. The entire disclosure of this application is hereby incorporated by reference.

Figure 2:
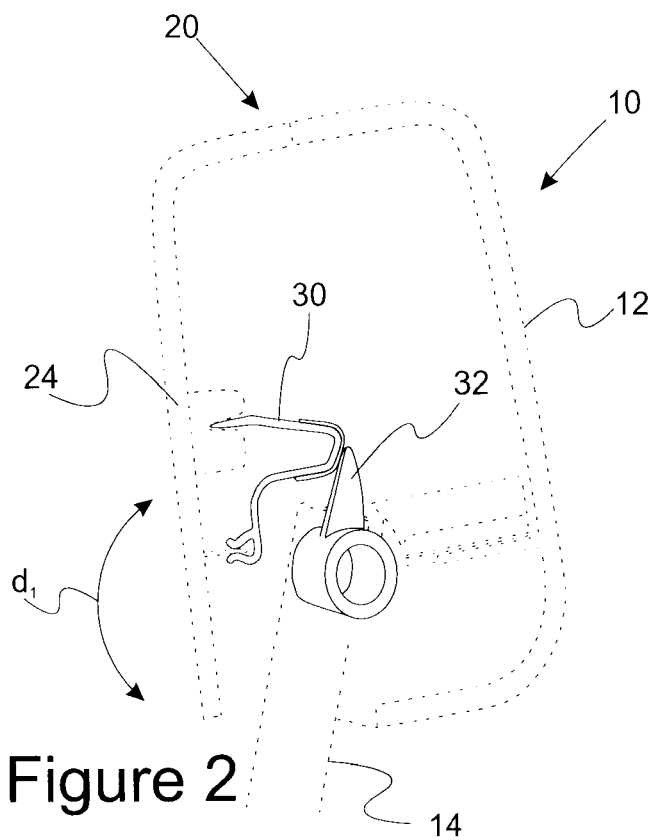
FIG. 2 is a schematic cross section showing another variation for the incorporating a chuck eliminating clip in a head restraint.

With reference to FIG. 2, a schematic cross section showing another variation for incorporating a chuck eliminating clip in a head restraint is provided. In this variation, spring clip 30 is attached to front shell 24 of head restraint 10. Operation of this variation is similar to that of the head restraint of FIG. 1 with the head restraint pivoting along direction $d_1$ so that spring clip 30 engages stop 32 in the upright position, thereby reducing chuck.

Figure 3:
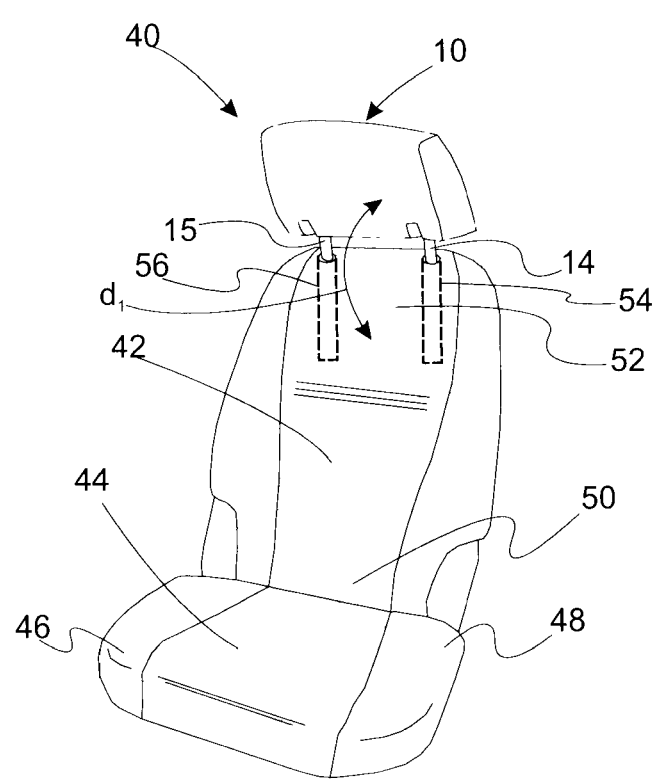
FIG. 3 is a perspective view of a vehicle seat incorporating a head restraint with a chuck eliminating clip.

With reference to FIG. 3, a perspective view of a vehicle seat incorporating a variation of the head restraint of FIG. 1 is provided. Head restraint 10 is attached to vehicle seat 40 via posts 14 and 15. Vehicle seat 40 includes seat back 42 and seat bottom 44. Seat bottom 44 includes forward section 46 and rear section 48. Seat back 42 has bottom section 50 positioned proximate to rear section 48 of seat bottom 44. Head restraint 10 is attached to top section 52 of seat back 42. In the variation depicted in FIG. 2, head restraint 10 is attached to seat back 42 such that posts 14, 15 are slidably positioned in receptacles 54, 56.

Figure 4A:
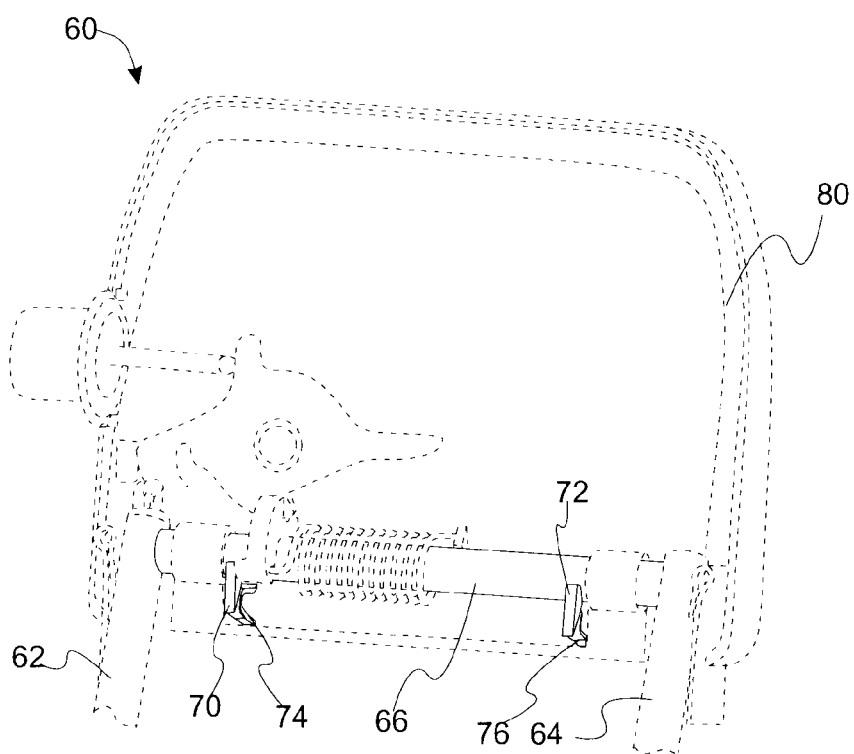
FIG. 4A is a perspective view of the internal structure of a head restraint having a pair of spring clips for reducing chuck and using posts for attachment.

With reference to FIG. 4A, a perspective view of the internal structure of a head restraint having a pair of spring clips for reducing chuck is provided. In this variation, head restraint 60 includes posts 62, 64 which are attached to cross member 66. Stops 70, 72 are attached to cross member 66 while spring clips 74, 76 are directly or indirectly attached to head restraint frame 80. In this variation, head restraint frame 80 pivots relative to cross member 66 and posts 62, 64.

Figure 4B:
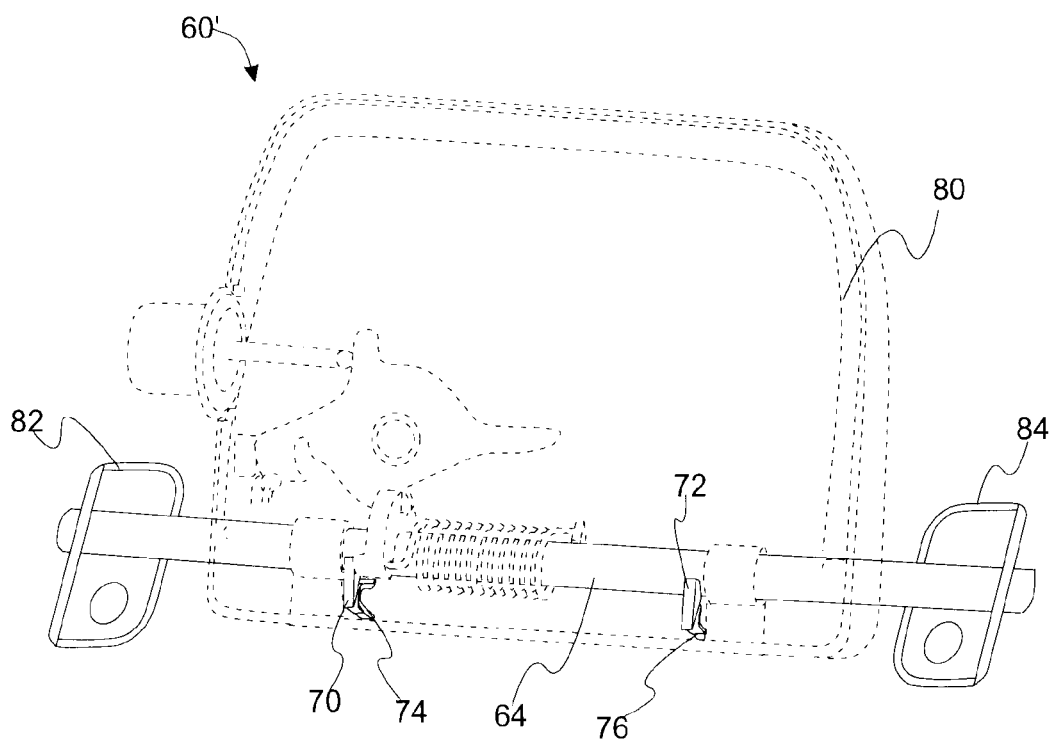
FIG. 4B is a perspective view of the internal structure of a head restraint having a pair of spring clips for reducing chuck and using brackets for attachment.

With reference to FIG. 4B, a perspective view of the internal structure of a head restraint having a pair of spring clips for reducing chuck is provided. In this variation, head restraint 60' includes brackets 82, 84 as support structures which are attached to cross member 66. Stops 70, 72 are attached to cross member 66 while spring clips 74, 76 are directly or indirectly attached to head restraint frame 80. In this variation, head restraint frame 80 pivots relative to cross member 66 and brackets 82, 84.

Figure 5:
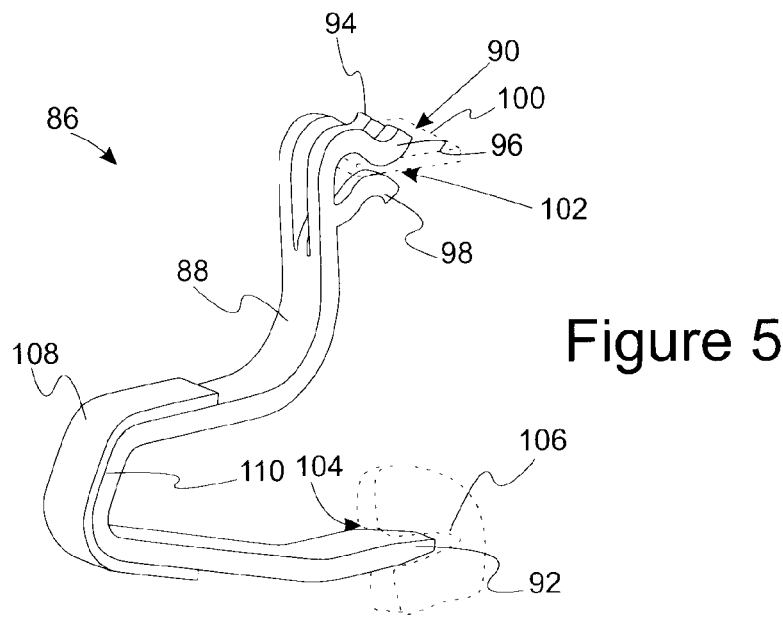
FIG. 5 is a perspective view of a spring clip used to eliminate chuck in a head restraint.

With reference to FIG. 5, a perspective view of a spring clip used in one or more of the embodiments and variations set forth above is provided. Spring clip 86 includes elongate strip 88 having a first end 90 and second end 92. Strip 86 may be formed from any suitable flexible material, examples of which include, but are not limited to, metals, steels, aluminum, plastics, and combinations thereof. Strip 88 is shaped such that the first end and the second end contact the head restraint frame or a component attached to the head restraint frame. First end 90 is a clip section which is adapted to clip on a structure component of a head restraint. First end 90 includes fingers 94, 96, 98 which cooperate to hold a portion of a head restraint structural element 100 that is placed within opening 102. In a refinement, structural element 100 is a substantially flat component, such as a structural rib, placed within opening 102. In a refinement of the present variation, second end 92 is held within receptacle 104 in head restraint component 106. Second end 92 is held so that spring clip 92 maintains its position after repeated positioning of the head restraint from the upright to the folded positions. In a refinement of the spring clip, coating 108 is located over area 110 of strip 88. Area 110 is located at a position of contact between the spring clip and the stop as set forth above. Examples of suitable coating materials include, but are not limited to, coating plastics or rubber resins. A particularly useful material for coating 108 is a Teflon.

Figure 6:
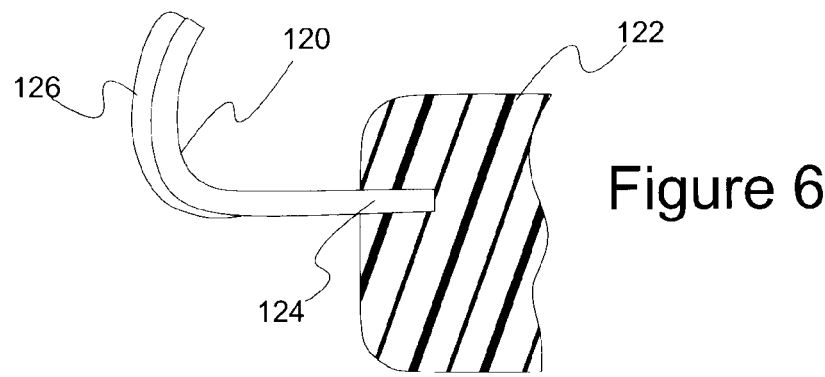
FIG. 6 is a schematic cross section of a spring clip that may be used in the head restraints described above.

With reference to FIG. 6, a schematic cross section of a spring clip that may be used in the head restraints described above is provided. Spring clip 120 is attached to head restraint frame component 122 at end 124. Spring clip 120 is optionally coated with plastic layer 126 as set forth above.

Figure 7:
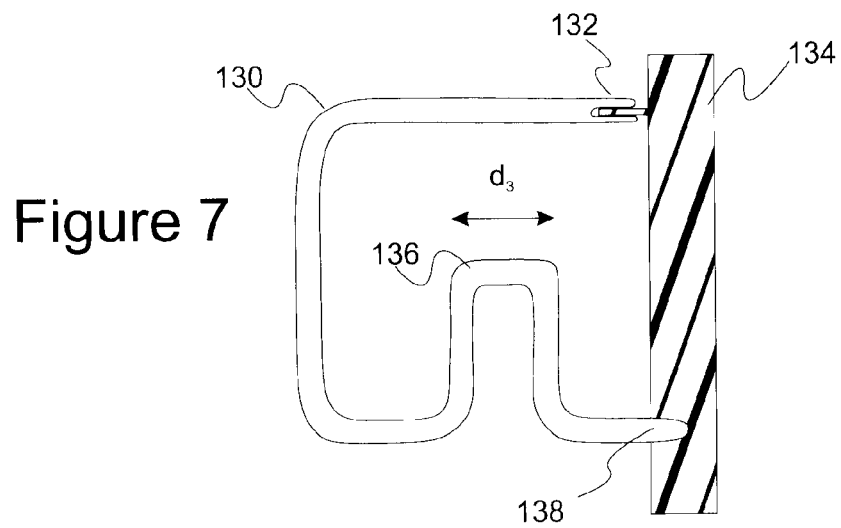
FIG. 7 is a schematic cross section having an internal bend.

With reference to FIG. 7, a schematic cross section having an internal bend is provided. In this variation, spring clip 130 includes attachment end 132 that is attached to head restraint frame component 134. Spring clip 130 includes internal bend section 136 which allows the spring clip flexibility to move along direction $d_3$. In this variation, end 138 is also attached to head restraint frame component 134.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A head restraint comprising:
a head restraint frame having a support structure for positioning the head restraint proximate to a seat back, the head restraint being pivotable relative to the support structure;
a spring clip attached to the head restraint frame herein wherein the spring clip comprises an elongate strip having a first end and a second end, the strip being shaped such that the first end and the second end contact the head restraint frame, the strip including a clip section having attachment fingers for holding a head restraint structural component; and
a stop rigidly held relative to the support structure, such that the stop contacts the spring clip when the head restraint is positioned in an upright position such that chuck in the head restraint is reduced or eliminated.

2. The head restraint of claim 1 wherein the spring clip comprises a coating over an area of contact between the spring clip and the stop.

3. The head restraint of claim 2 wherein the coating comprises a plastic or rubber resin.

4. The head restraint of claim 1 wherein the support structure includes a post or a bracket.

5. The head restraint of claim 1 wherein the strip comprises a material selected from the group consisting of metals, steels, plastics, and combinations thereof.

6. The head restraint of claim 1 wherein the head restraint frame includes a receptacle for receiving the second end of the strip.

7. The head restraint of claim 1 wherein the stop contacts the spring clip when the head restraint in positioned in an upright position such that chuck in the head restraint is reduced when compared to a head restraint that does not include the spring clip.

8. A head restraint comprising:
- a head restraint frame having a pair of posts for attaching the head restraint to a seat back, the head restraint rotatable relative to the pair of posts;
- a cross member attached to the pair of posts;
- a spring clip attached to the head restraint wherein the spring clip comprises an elongate strip having a first end and a second end, the strip being shaped such that the first end and the second end contact the head restraint frame, the strip including a clip section having attachment fingers for holding a head restraint structural component; and
- a stop rigidly held relative to the cross member, such that the stop contacts the spring clip when the head restraint in positioned in an upright position such that chuck in the head restraint is reduced or eliminated.

9. The head restraint of claim 8 wherein the spring clip comprises a coating over an area of contact between the spring clip and the stop.

10. The head restraint of claim 9 wherein the coating comprises a plastic or rubber resin.

11. The head restraint of claim 8 wherein the strip comprises a material selected from the group consisting of metals, steels, plastics, and combinations thereof.

12. The head restraint of claim 8 wherein the stop contacts the spring clip when the head restraint in positioned in an upright position such that chuck in the head restraint is reduced when compared to a head restraint that does not include the spring clip.

13. A vehicle seat comprising:
- a seat bottom having a forward and rear section;
- a seat back having a bottom section positioned proximate to the rear section;
- a head restraint comprising:
    - a head restraint frame having a support structure for positioning the head restraint proximate to a seat back, the head restraint being pivotable relative to the support structure;
    - a spring clip attached to the head restraint frame wherein the spring clip comprises an elongate strip having a first end and a second end, the strip being shaped such that the first end and the second end contact the head restraint frame, the strip including a clip section having attachment fingers for holding a head restraint structural component; and
    - a stop rigidly held relative to the support structure, such that the stop contacts the spring clip when the head restraint is positioned in an upright position such that chuck in the head restraint is reduced or eliminated.

* * * * *